United States Patent [19]

Maeda et al.

[11] Patent Number: 4,743,774
[45] Date of Patent: May 10, 1988

[54] METHOD AND APPARATUS FOR OPTICAL DETECTION OF INFORMATION

[75] Inventors: Takeshi Maeda, Kokubunji; Shigeru Nakamura, Hachioji; Hisataka Sugiyama, Kokubunji; Kazuo Shigematsu, Saitama; Atsushi Saito, Ichikawa, all of Japan

[73] Assignee: Hitachi, Ltd., Tokyo, Japan

[21] Appl. No.: 828,719

[22] Filed: Feb. 12, 1986

[30] Foreign Application Priority Data

Mar. 22, 1985 [JP] Japan .................................. 60-55834

[51] Int. Cl.$^4$ ............................................. G06K 7/10
[52] U.S. Cl. .................................... 250/570; 369/124; 369/44
[58] Field of Search ...................... 250/202, 568, 570; 369/124, 275, 44

[56] References Cited

U.S. PATENT DOCUMENTS 4,525,822 6/1985 Nishimura .......................... 369/124

Primary Examiner—David C. Nelms
Assistant Examiner—Jessica L. Ruoff
Attorney, Agent, or Firm—Antonelli, Terry & Wands

[57] ABSTRACT

Method and apparatus for optically detecting information from a recording medium in which pits are formed by thermal energy of a light spot to record the information. A reproduction spot is irradiated onto the recording medium to produce a detection signal. From a differential signal of the detection signal, a signal indicative of zero points of the differential signal and a signal indicative of the presence of the pits are detected, and both the signals are used to detect positions of the pits. For stable and accurate detection of the pit position, the relation between pit size W and reproduction spot size $W_s$ is prescribed and the pit size and reproduction spot size are so set as to satisfy $0.45 \leq W/W_s \leq 0.75$.

20 Claims, 9 Drawing Sheets

METHOD AND APPARATUS FOR OPTICAL DETECTION OF INFORMATION

BACKGROUND OF THE INVENTION

This invention relates to method and apparatus for optically detecting information from a recording medium in which pits are locally formed by thermal energy of a light spot to record the information, and more particularly to an optical detection method and apparatus for stably detecting information from a recording medium which has the information at positions where pits have been recorded.

An example of an optical information recording-/reporting apparatus having information at center positions of hole-like pits is disclosed in an article entitled "Ten Billion Bits on a Disc", IEEE, SPECTRUM, Aug., 1979. Conventionally, in this type of apparatus, conditions required of pit size and reproduction light spot size for stable detection of information have not been known and a detection method capable of stably detecting the information has also been unknown.

SUMMARY OF THE INVENTION

This invention is directed to optical reproduction of a recording medium in which pits are locally formed by thermal energy of a light spot and information is recorded at positions of the pits, and has for its object to provide a method and apparatus for optical detection of information which can detect the information stably and accurately under less influence of variations in the pit size.

Since, in the recording medium having the information recorded in the form of pits formed by thermal energy of the recording light spot, sizes of the pits recorded on the recording medium vary depending on unevenness in sensitivity of a recording film, variations in the level of recording laser power and changes in the shape of the recording light spot due to focus error, it is of great significance to detect positions of the pits with stability and accuracy against variations in the pit size.

To accomplish the above object, according to one feature of the invention, positions of the pits are detected using a differential signal of a detection signal generated by irradiation of a reproduction light spot.

According to another feature of the invention, the relation between pit size and reproduction spot size necessary for stable and accurate detection of pit positions is prescribed. More particularly, the relation between pit size W and reproduction spot size $W_s$ is set such that $0.45 \leq W/W_s \leq 0.75$ is satisfied. Within this range, the gradient of the differential signal is substantially constant and the pit position can accurately be detected using only the differential signal. As will be described later, in order to accurately detect the pit position by using a decrease in amplitude of the detection signal, the pit size must substantially equal the reproduction spot size, resulting in a disadvantage which is unacceptable from the standpoint of high density packaging of information. On the other hand, if the pit size is made smaller than the reproduction spot size, a decrease in quantity of light at the pit center will greatly vary with a slight variation in the pit size, resulting in impairment of stability of detection. Contrary to this, according to the invention, the pit size is confined within the range of 0.45 to 0.75 times the reproduction spot size so that variations in the gradient of the differential signal can be suppressed to about 10% of its maximum value and the position of the information pit can be detected stably and accurately by using only the differential signal. This leads to a great advantage for high density packaging of information and ensures the detection of pit positions with stability and accuracy against variations in the pit size.

BRIEF DESCRIPTION OF THE DRAWINGS

FIGS. 1 to 6d are diagrams for explaining the principle of detection on which the present invention is based, wherein

DESCRIPTION OF THE PREFERRED EMBODIMENTS

The principle of a detecting method according to the present invention will first be described. Assuming that a reproduction light spot 2 having a predetermined spot size or diameter of $W_s$ passes over an array of variable density type circular pits 1 of different diameters, as generally represented by W, in a linear direction of arrow (track direction), behavior of a detection signal 3 indicative of quantities of light reflected from the pits will be analyzed.

Figure 2A:
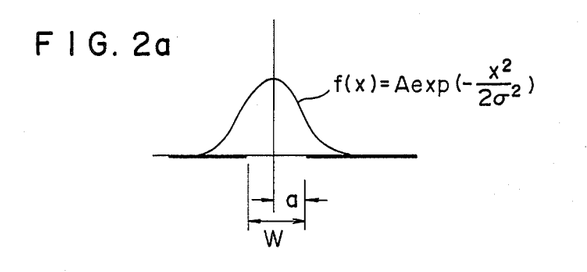
FIGS. 2a and 2b illustrate the relation between the reproduction spot and a pit.

Strictly, in order to analyze changes in quantities of reflection light caused when the light spot 2 passes over the pits 1, calculation of two-dimensional diffraction is needed but since the pit 1 and the light spot 2 are both symmetrical with the travelling direction of the light spot (track direction), a linear approximation which takes into account only the influence of movement in the travelling direction will suffice. Accordingly, an analysis of the detection signal will be described using a pit having a length W equal to 2a in the travelling direction and a light spot having an intensity distribution in the travelling direction represented by a function f(x), as shown in FIG. 2a where variable x is representative of a travelling distance.

Figure 2B:
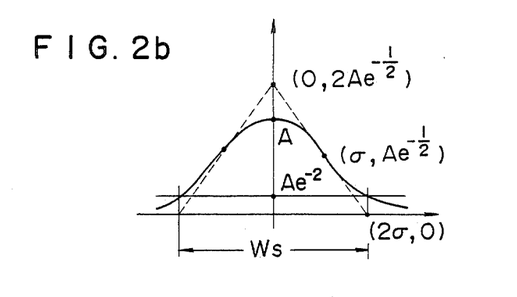

Assume now that the function f(X) is indicated by a Gaussian function as follows:

$$f(x) = A \exp\left(-\frac{x^2}{2\sigma^2}\right)$$

where A is a constant and $\sigma$ is a standard deviation. Then, the function f(x) can be approximated by a dotted-line triangle as shown in FIG. 2b. To explain the approximation, when calculating differentials of first order and second order of the function f(x) respectively indicated by $$f'(x) = -A \cdot \frac{x}{\sigma^2} \exp\left(-\frac{x^2}{2\sigma^2}\right)$$

and $$f''(x) = A \exp\left(-\frac{x^2}{2\sigma^2}\right)\frac{1}{\sigma^2}\left(1 - \frac{x^2}{\sigma^2}\right),$$

there result a point of inflexion of the function f(x) which is $x = \pm\sigma$ and a differential coefficient at the point of inflexion which equals $$-A\frac{e^{-\frac{1}{2}}}{\sigma}.$$

Figure 3:
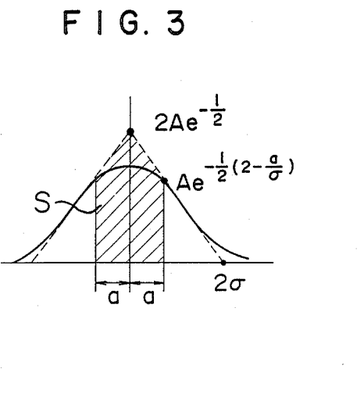
FIG. 3 is a diagram for explaining a decrease in quantity of light at the pit center.

Consequently, the approximated triangle has coordinates of apices as illustrated in FIG. 2b. In this instance of approximation, the reproduction light spot size $W_s$ becomes $4\sigma$. Due to the fact that a decrease in the quantity of light at the center of a pit equals a hatched area S shown in FIG. 3, this decrease can easily be obtained from the following equation.

$$S(a) = \frac{A}{\sigma} e^{-\frac{1}{2}} (4\sigma - a) \times a$$

The above function S(a) is differentiated as follows:

$$\frac{d}{dx}\left[\int_{x-a}^{x+a} f(u)du\right] = f(x + a) - f(x - a)$$

Figure 4:
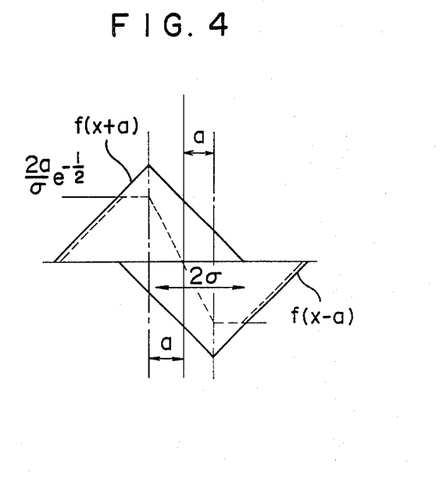
FIG. 4 is a diagram for explaining the relation between a differential signal and the pit size.

This equation indicates that an output representative of the differential of the area S, i.e., the differential of the decrease in the quantity of light is obtained from the difference between f(x+a) and f(x−a). These functions f(x+a) and f(x−a) are approximated as illustrated in FIG. 4. It will be seen from FIG. 4 that if $2a \geq 2\sigma$, the peak of the differential output signal is constant for changes in the pit size (W=2a) and if $2a > 4\sigma$, the zero point of the differential output signal can not be detected. The differential output signal has a dotted-line waveform as shown in FIG. 4 and hence its peak value is, $$A\frac{2a}{\sigma} e^{-\frac{1}{2}} \text{ for } 2a < 2\sigma$$

Figure 1:
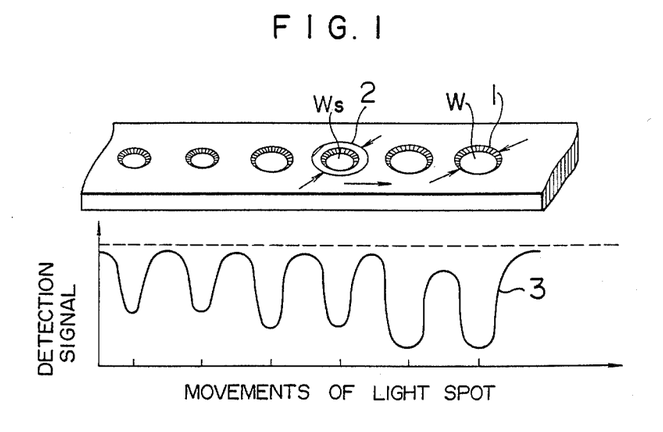
FIG. 1 is a diagram for explaining a detection signal generated by irradiation of a reproduction light spot.
Figure 5:
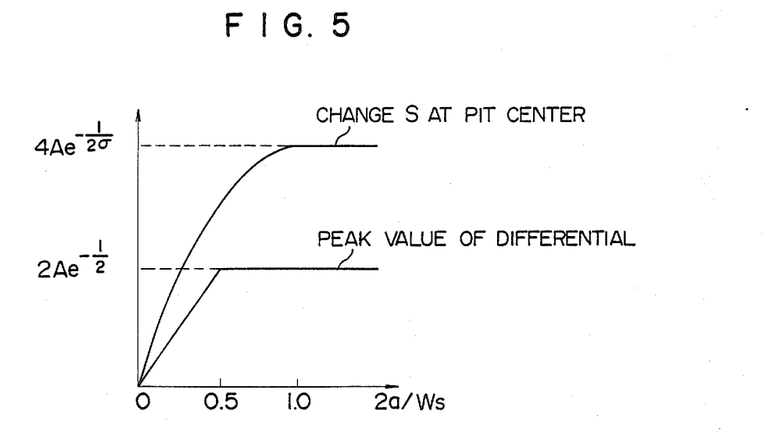
FIG. 5 is a graph showing changes in the quantity of light at the pit center and a peak value of differential waveform with respect to changes in ratio between the reproduction spot size and the pit size.

-continued $$2Ae^{-\frac{1}{2}} \text{ for } 2a \geq 2\sigma$$

where 2a represents the pit size or diameter as mentioned above. The pit size is related, as graphically shown in FIG. 5, to the change (decrease) S in light quantity (detection signal) at the pit center and the peak value of the differential output signal. In FIG. 5, abscissa represents the pit size 2a which is normalized by the spot size $W_s$. As will be seen FIG. 5, in order that the decrease in the light quantity at the pit center is less affected by changes in the pit size and stably used for detection of the pit center position, the pit size must approximate $4\sigma$. In other words, it is required that the pit size 2a approximate the spot size $W_s$. This requirement is disadvantageous from the standpoint of packaging of high density of information. On the other hand, if the pit size is smaller than the reproduction light spot size, then the decrease in the light quantity at the pit center will greatly change with slight variations in the pit size, making it difficult to stably detect the center position of the pit by using that decrease. The waveform of the detection signal 3 shown in FIG. 1 also tells clearly that the decrease in the light quantity at the pit center changes when the pit size changes. Contrary to this, in order that the differential output signal is stably used for the same purpose, the pit size must be $2\sigma \leq 2a \leq 4\sigma$ which is $W_s/2 \leq 2a \leq W_s$ terms of the reproduction light spot size $W_s$.

Figure 6A:
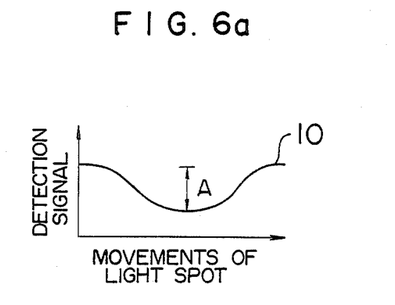
FIGS. 6a to 6d are diagrams useful in explaining a two-dimensional analysis.

Results of the linear or one-dimensional analysis have been described. When two-dimensional calculation is effected for a light spot size which is (spot size at $1/e^2$)·$W_s = 1.4$ μm, results as shown in FIGS. 6a to 6d are obtained. As a reproduction light spot passes over a pit, light is reflected from the recording medium and subjected to photoelectric conversion to produce a detection signal 10 which changes by A at the center of the pit as shown in FIG. 6a.

Figure 6B:
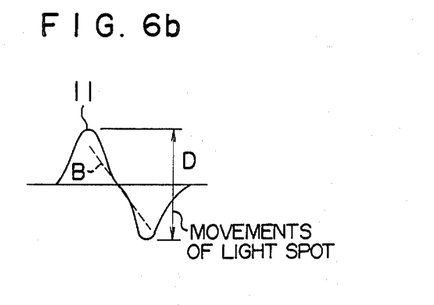
Figure 6C:
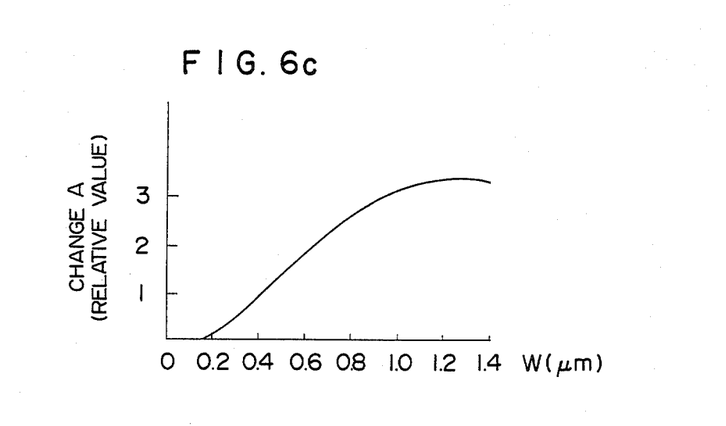
Figure 6D:
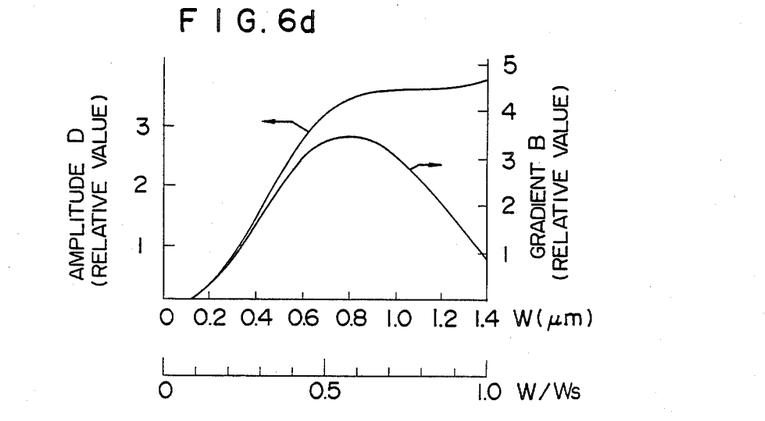

The detection signal 10 is differentiated with respect to the spot movement to provide a differential signal 11 as shown in FIG. 6b which becomes zero at the pit center. By detecting this zero point, the center position of the pit can be detected correctly. Where as shown in FIG. 6b the differential signal 11 has an amplitude D and a gradient B at the zero point, behavior of the amplitude D and gradient B with respect to changes in the pit size W as shown in FIG. 6d can be observed. FIG. 6c illustrates behavior of the signal change A with respect to changes in the pit size. The behavior of the change A in the detection signal 10 resembles that of the amplitude D of differential signal 11 with respect to changes in the pit size, as viewed from the axis which represents the pit size W normalized by the spot size $W_s$.

The relation between the pit size W and the reproduction spot size $W_s$ which is necessary for accurately detecting the center position of the pit by using the differential signal 11 can be determined from FIG. 6d. To detect the peak point of the detection signal 10, the zero point of the differential signal 11 is measured. But the differential signal 11 for the detection signal 10 shown in FIG. 6a also becomes zero outside the pit as will be seen from FIG. 6b. Therefore, for the detection of the pit center position based on the differential signal, the presence or absence of the pit must be detected. A measure to this end is conceivable wherein the change A in detection signal 10 at the pit center is used. This measure is however practically unacceptable because the change A in detection signal 10, as will be seen from FIG. 6c, greatly varies with changes in the pit size. In view of the above, according to the invention, the presence or absence of the pit is detected from the differential signal 11 to overcome the aforementioned difficulties. More particularly, the present invention takes advantage of the fact that the polarity of the gradient B is constant at the pit center, and the presence or absence of the pit is detected by judging that polarity.

Further, to ensure that the zero point of the differential signal 11 can be detected accurately at the pit center, elimination of a blind zone around the zero point (namely, necking down as shown in FIG. 6b) is needed. The necking down is due to a change in the gradient B and when considering FIG. 6d to admit about 10% change in the gradient B from practical point of view. $W/W_s \leq 0.75$ must be satisfied.

In addition, to minimize errors in detection of the zero point of differential signal 11 which would be caused by noises superimposed on the detection signal 10, the magnitude of the gradient B is desired to be large.

Briefly, for the intended stable detection, the gradient B must approximate its maximum value and its variations must be minimal when referenced to changes in the pit size, leading to a practical requirement of $W/W_s \geq 0.45$.

From the above, it can be concluded that as far as $0.45 \leq W/W_s \leq 0.75$ is satisfied, the pit center position can stably be detected using the differential signal 11 even when the pit size varies.

Because of complete compatibility of the one-dimensional model with the two-dimensional calculation, the aforementioned relationship should be held for the detection wherein the reproduction light spot reads the pits in the linear direction (track direction).

Figure 13:
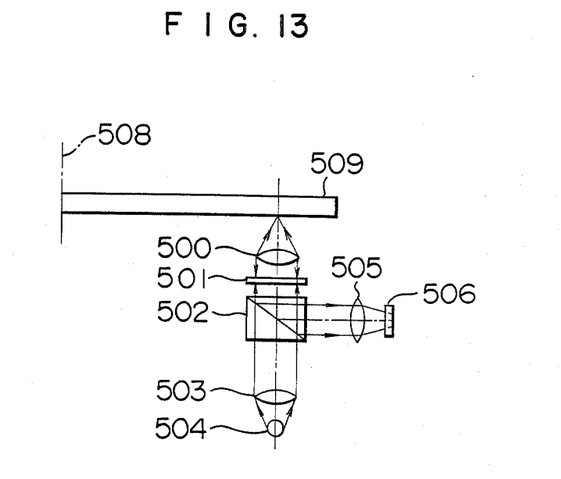
FIG. 13 is a schematic diagram showing an optical disc memory apparatus.

Formation of the recording pits will now be described in greater detail. FIG. 13 shows an essential part of an optical system included in an optical disc apparatus used for implementation of the present invention. Flux of light emitted from a laser source 504 passes through a coupling lens 503, a polarization beam splitter 502 and a ¼ wavelength plate 501 and is focused by an objective lens 500 to form a light spot on a recording film of a disc 509 rotating about a rotary axis 508. The disc 509 is comprised of a transparent substrate and the recording film, and the laser beam irradiates the recording film through the substrate. As output power of the laser beam is increased in accordance with information to be recorded, the level of power of the light spot irradiated on the recording film is increased correspondingly. When such a high power light spot is concentrated on the recording film, heat generated by the laser beam irradiation causes local evaporation and thermal motion and the recording film is locally deformed. As a result, a portion of the substrate underlying an irradiated area of the recording film is exposed and a molten portion of the film is circumferentially stretched under the influence of surface tension to form a hole in the recording film. This hole is a recording pit which is called a variable density (or amplitude structure) type pit. A recording film of a material containing Te as a main constituent is most preferably used as the recording film for the formation of the variable density type pit. An example of the material is disclosed by Terao et al in Proceedings of SPIE (Society of Photo-Optical Instrumentation Engineers), Vol. 382, (1983), pp. 276–281.

In experiments, the objective 500 has a numerical aperture of 0.5, the laser source 504 is a laser diode or semiconductor laser having a wavelength of 830 nm, and a light spot having a spot size of 1.6 μm (at $1/e^2$ of the maximum intensity) is formed on the surface of a 300 mm diameter disc using a recording film made of the Te system material. When recording is effected under a condition that irradiation time is 100 ns and the revolution number of the disc corresponds to 10 Hz, the relation between the level of power of the recording spot and the diameter W of a recorded hole (pit size) as shown in FIG. 14 is actually measured.

Figure 14:
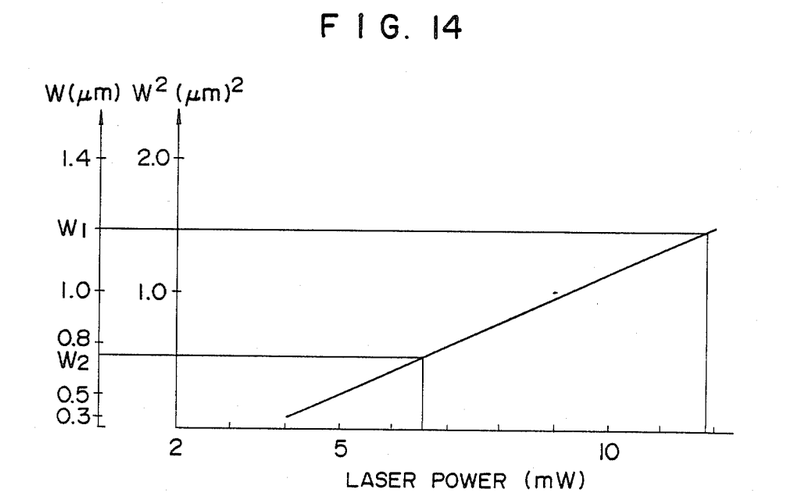
FIG. 14 is a graph showing the relation between the laser power level and the pit size.

In FIG. 14, the ordinate represents squared pit sizes in unit of $\mu m^2$ along with pit sizes converted from the squared values. Since in this example the spot size $W_s$ is 1.6 μm, the most preferable range of the pit size W according to the invention ranges from $W_1 = 1.44$ μm to $W_2 = 0.72$ μm. This pit size range corresponds to a range of laser power of from 6.5 mW to 11.7 mW and according to the invention, the pit position can be detected accurately even when the laser power varies within this range.

Returning to FIG. 13, light reflected from the disc 509 is condensed by the objective 500, passed through the ¼ wavelength plate 501, and reflected at the polarization beam splitter 502 so as to be separated from the irradiation beam. The reflection light delivered from the polarization beam splitter 502 is focused by a lens 505 and received by a photodetector 506 for photoelectric conversion. When a two-divided light detector or a three-divided light detector, for example, is used as the photodetector 506, a tracking signal can be detected. For detection of the tracking signal, various methods are known of which one is disclosed in, for example, U.S. Pat. No. 4,525,826. The tracking signal drives a galvanomirror (not shown) disposed, for example, between the beam splitter and the objective to control the light spot such that it follows a track on the disc. Further, a focus signal detecting system is provided as necessary so that a focus signal can also be detected using the reflection light from the disc. Various types of focus signal detecting system are known as disclosed in, for example, U.S. Pat. Nos. 4,450,547 and 4.293,944. The focus signal drives a voice coil (not shown) mounted, for example, to the objective 500 to cause the focal point of the objective to follow movements of the disc 509, thereby ensuring stable formation of the light spot on the recording film. The tracking signal detecting system and focus signal detecting system have no direct relation to the subject of the present invention and are not illustrated in FIG. 13. All of the components 500 to 506 or some of them inclusive at least of the objective 500 are arranged in a cabinet which is moved by a driver such as a linear motor in the radial direction of the disc.

The pits formed in the recording film of the disc are detected as output signals from the photodetctor 506. When reproducing, the power level of the laser beam emitted from the laser source 504 is so decreased that the laser beam irradiation will not deform the recording film.

A signal detecting method according to the invention will now be described by making reference to FIGS. 7 and 8. An array of pits 21, 22, 23, 24 and 25 recorded on the disc as described previously is illustrated at section (a) in FIG. 8, and a signal 20 (the output signal from the photodetector 506 shown in FIG. 13) detected when the reproduction laser spot passes over these pits has a waveform as shown at section (b) in FIG. 8 which is related to the respective pits. Specifically, the signal level decreases in response to the presence of the pit and rises in response to the absence of the pit. This signal 20 is applied via a buffer amplifier 26 to a low-pass filter 27 at which the signal is removed of noises at high frequencies beyond a signal band. An output signal of the low-pass filter 27 is applied to a differentiation circuit 28 which in turn produces an output signal 29 as shown at (c) in FIG. 8.

This differential signal 29 is applied to a circuit 70 adapted to detect the presence or absence of pits. This embodiment takes advantage of the fact that the gradient of the differential signal is negative (right-downward inclination) at a black point indicative of the pit center. The circuit 70 comprises comparators 30 and 31, and a D-T flip-flop 34. At the comparators 30 and 31, the differential signal 29 is subjected to level slicing referenced to predetermined levels $L_1$ and $L_2$ and hence signals 32 and 33 as shown at (d) and (e) can be obtained. The signal 32 is a binary signal which becomes "high" during positive excursion of differential signal 29 below the predetermined level $L_1$, and the signal 33 is a binary signal which becomes "high" during negative excursion of differential signal beyond the predetermined level $L_2$. These signals 32 and 33 are inputted to the D-T flip-flop 34, as shown in FIG. 7, so as to set this flip-flop in timed relation to the rise of the signal 32 and reset it in timed relation to the fall of the signal 33, thereby causing the D-T flip-flop 34 to produce an output signal 35 as shown at (g) in FIG. 8 which is indicative of only the presence of the pit.

On the other hand, a zero cross detection circuit 60 is used for detection of zero points of the differential signal 29. The zero cross detection circuit 60 comprises a comparator 36, a delay line 37, and an exclusive OR circuit 38. At the comparator 36, the differential signal 29 is subjected to level slicing referenced to zero level, and a resulting signal is fed via the delay line 37 to one input of the exclusive OR circuit 38 and directly to the other input, causing the exclusive OR circuit 38 to produce an output signal 39. As shown at (f) in FIG. 8, the output signal 39 rises in timed relation to the zero points and has a pulse width corresponding to a delay amount provided by the delay line 37.

In order to obtain a signal indicative of the center position of the pit, the signals 39 and 35 are ANDed at a gate circuit 40.

Thus, according to this embodiment, the pit center position can be detected accurately on the basis of only the differential signal 29 of the detection signal 20 even when the pit size varies with variations in the power level of the recording beam.

Another embodiment for detection of the pit center position will be described with reference to FIGS. 9 and 10. As in the previous embodiment, a detection signal 20 as shown at (a) in FIG. 10 is passed through an amplifier 26, a low-pass filter 27 and a differentiation circuit 28 so as to be converted into a differential signal 29 as shown at (b) in FIG. 8. The differential signal 29 is inputted to a zero cross detection circuit 60 of the same type as described in connection with the previous embodiment and a signal 39 as shown at (c) in FIG. 10 is obtained. A circuit 70' adapted to detect the presence of pits comprises, according to this embodiment, a low-pass filter 27', a differentiation circuit 28' and a comparator 50.

The differential signal 29 inputted to the circuit 70' is passed through the low-pass filter 27' and differentiation circuit 28' so as to be converted into a signal 51 as shown at (d) in FIG. 10. At the comparator 50, this signal 51 indicative of the gradient of the differential signal 29 is subjected to level slicing referenced to a predetermined level $L_3$ and as a result, a specified level of a specified polarity is selected from the signal 51 to thereby detect a signal 35' indicative of the presence of pits. By passing the signals 35' and 39 through a gate circuit 40, a signal indicative of the pit center position can be detected accurately.

Grounding on condition that the relation between the pit size W and the spot size $W_s$ satisfies $0.45 \leq W/W_s \leq 0.75$ and within this range, the gradient of the differential signal is substantially constant, the previous embodiments can ensure that the presence of the pits can stably be detected and consequently, the pit center can be detected accurately.

Figure 7:
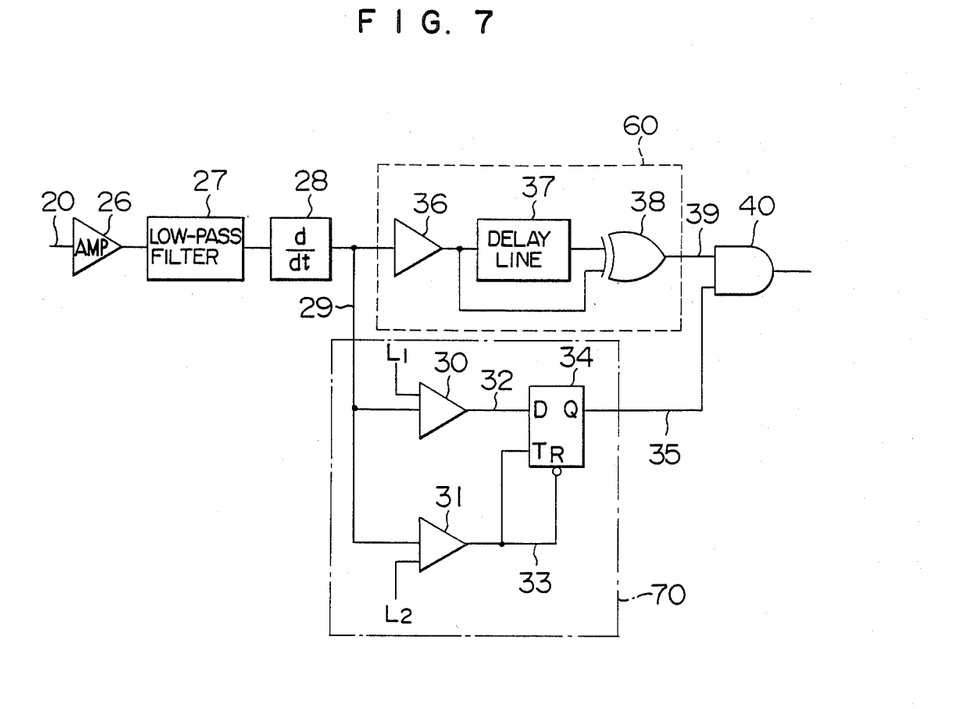
FIG. 7 is a block diagram showing an example of a detection circuit for implementation of the invention.
Figure 8:
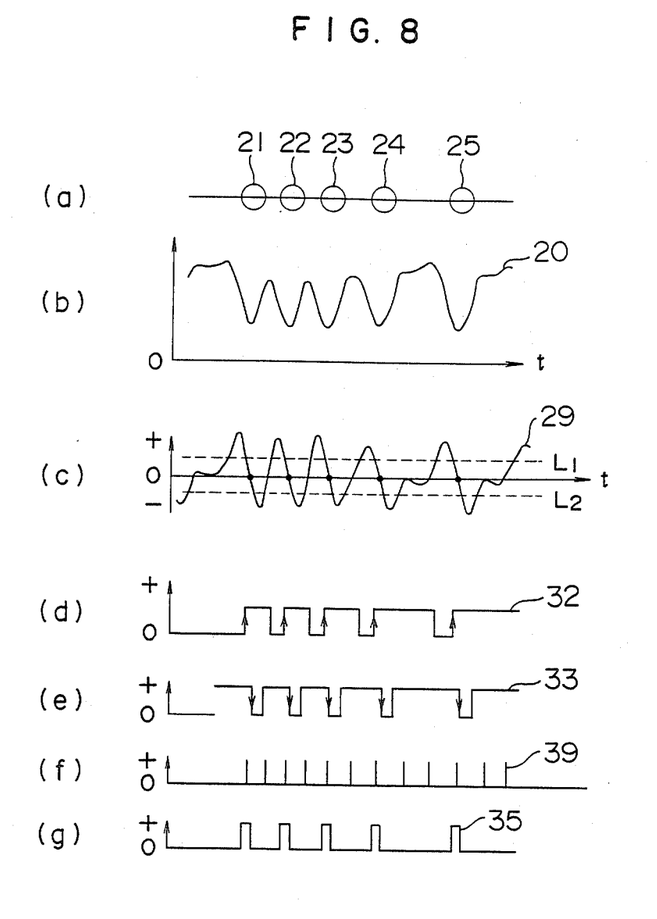
FIG. 8 is a time chart for explaining the operation of the FIG. 7 detection circuit.
Figure 9:
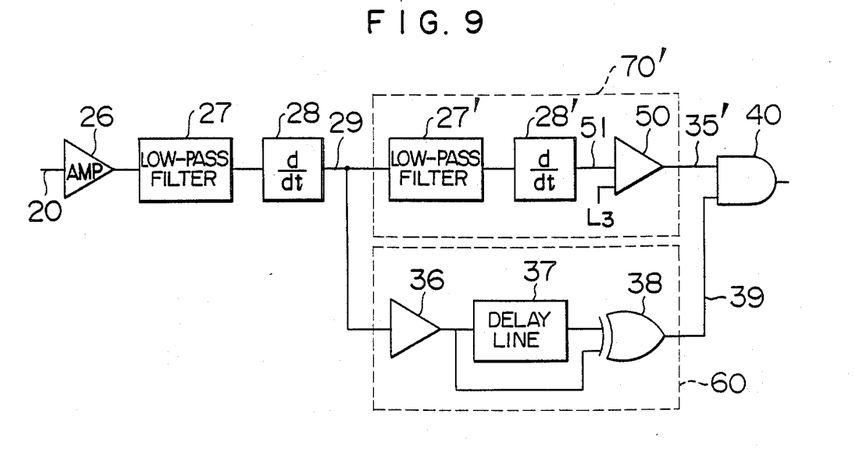
FIG. 9 is a block diagram showing another example of a detection circuit for implementation of the invention.
Figure 10:
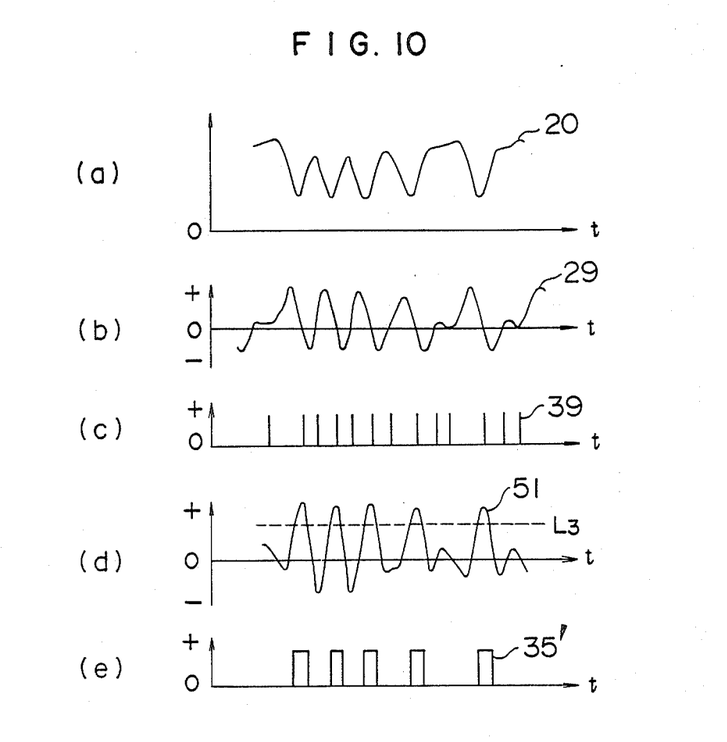
FIG. 10 is a time chart useful to explain the operation of the FIG. 7 detection circuit.

Although the foregoing embodiments have been described by way of example of detecting the center position of circular pits, front and rear edges of elongated pits having information recorded at edge portions can also be detected accurately by using a detection circuit of a construction similar to that of the detection circuit arrangement shown in FIG. 7 or 9. Typically, a modulation scheme applicable to pit edge recording is designed to exclude a DC component on a frequency spectrum. This is because, in signal transmission, AC coupling is necessarily employed and hence it is necessary to prevent an average value of a signal after the AC coupling from varying. If the average value varies, then points crossing a slice level used for detection of the edge portions will vary and normal or current data will not be detected. But, in general, information can not be coded at high density in the modulation scheme removed of the DC component. A modulation scheme directed to high coding efficiency necessarily tends to include a DC component.

Figure 11:
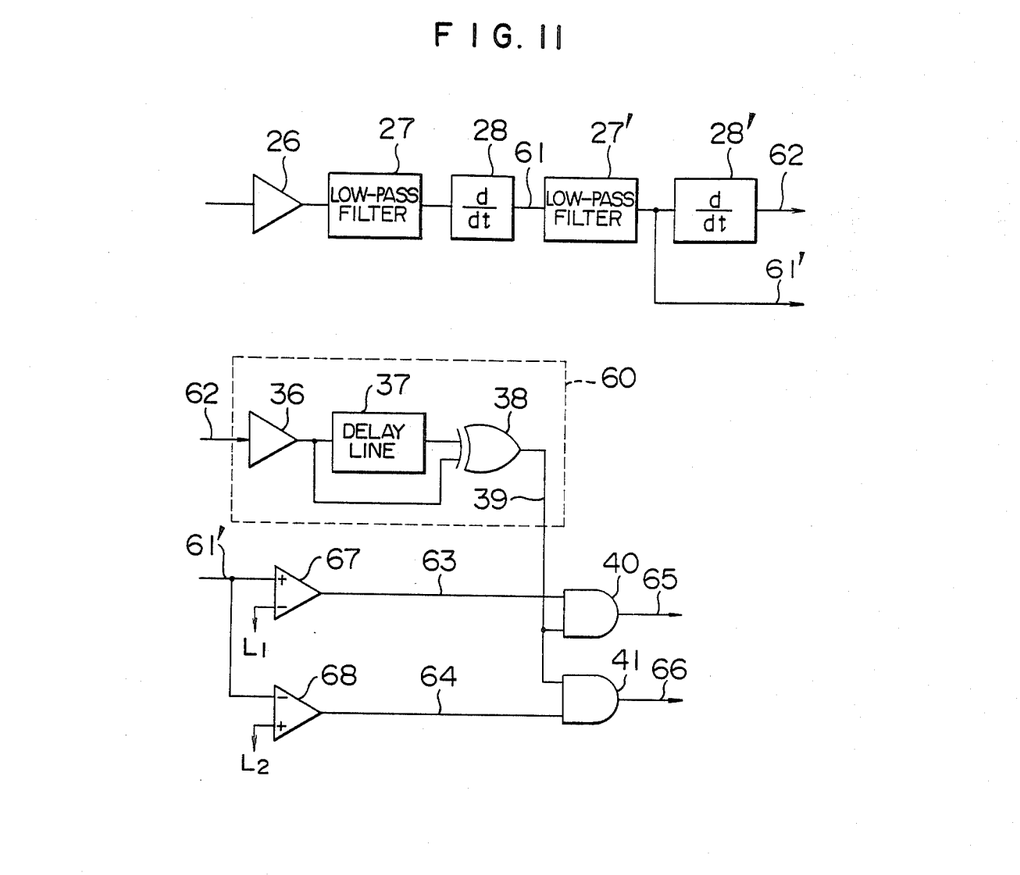
FIG. 11 is a block diagram showing an example of a detection circuit for detecting front and rear edges of elongated pits according to the invention.

Thus, the following description with reference to FIGS. 11 and 12 will be given of a detection method which can stably detect information from pit edge recording pursuant to the modulation scheme including the DC component.

Figure 12:
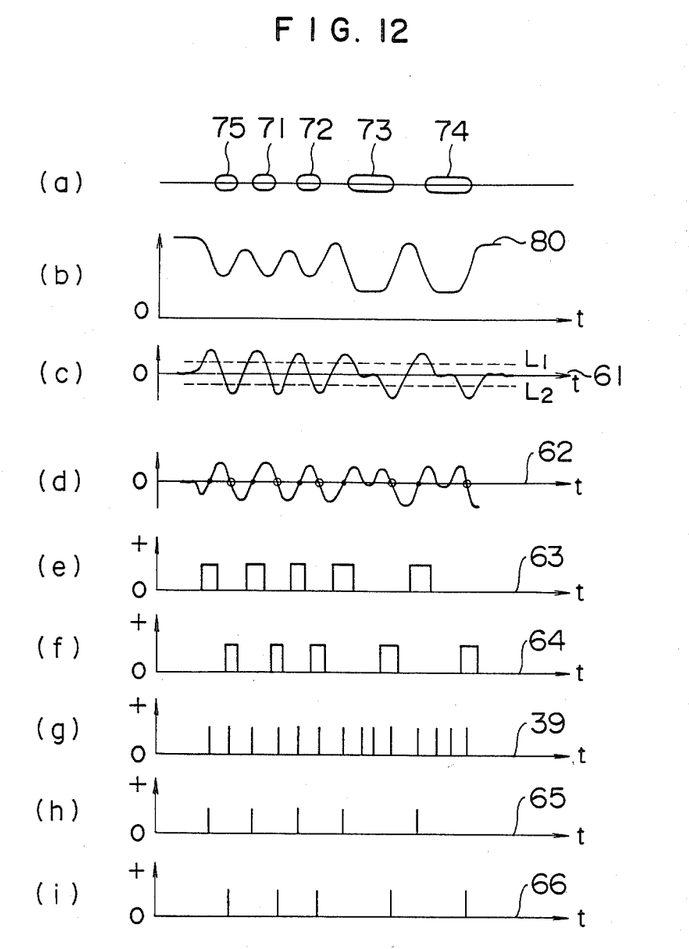
FIG. 12 is a time chart useful to explain the FIG. 11 detection circuit.

Information is coded under the modulation scheme of high coding efficiency and recorded on the disc surface in the form of an array of pits 75, 71, 72, 73 and 75 as shown at (a) in FIG. 12. A detection signal 80 originating from the pit array has a waveform as shown at (b) in FIG. 12. This signal 80 is applied via a DC amplifier 26 and a low-pass filter 27 to a differentiation circuit 28, which differentiates the detection signal 80 and produces a first order differential signal 61 as shown at (c) in FIG. 12. Essentially, this signal 61 contains no DC component and can be AC coupled for transmission. The signal 61 is removed of noises at high frequencies by means of a low-pass filter 27' to provide a signal 61' which in turn is fed to a differentiation circuit 28', a level comparator 67 and a level comparator 68. An output signal 62, as shown at (d) in FIG. 12, from the differentiation circuit 28' is of a waveform of second order differential of the detection signal 80 and its zero cross points correspond to edge portions of the detection signal 80. Rising edges are designated by circular blank and falling edges are denoted by dots. A signal 39 as shown at (g) in FIG. 12 which is indicative of the zero cross points can be obtained using a circuit 60 of the same construction as that of the corresponding circuit in the previous embodiments. The first order differential waveform 61' is subjected to level slicing referenced to predetermined levels $L_1$ and $L_2$ to produce a signal 63 as shown at (e) and signal 64 as shown at (f) in FIG. 12 which are respectively used to judge whether the edge is a falling one or a rising one. Thus, the signal 63 corresponds to falling edges and the signal 64 to rising edges. The signal 63 is fed to one input of a gate circuit 40 and the signal 64 is to one input of a gate circuit 41. The signal 39 indicative of the zero cross points is fed to the other input of each of the gate circuits 40 and 41. The signals 39 and 63 are ANDed at the gate circuit 40 to provide a front edge pulse signal 65 as shown at (h) in FIG. 12. Similarly, the signal 39 and 64 are ANDed at the gate circuit 41 to provide a rear edge pulse signal 66 as shown at (i) in FIG. 12.

In the pit edge detection, it has experimentally confirmed that diffusion due to thermal characteristics of the recording film material acts more strikingly on the shape of the rear edge than on the shape of the front edge and the signal waveform indicative of the rear edge gets blunted. In such an event, the shape of the original elongated pit can accurately be reproduced by correcting the timing for detection of the rear edge position in accordance with the detection timing for the front edge position. This operation requires discrimination between the front edge and the rear edge and in this respect, the detection method according to the present invention is effective.

We claim:

1. An apparatus for optical detection of information comprising:
   a recording medium in which an array of pits are formed in a predetermined direction to record information;
   light irradiation means for irradiating a reproduction light spot onto said recording medium;
   means for generating a signal indicative of intensity of light modulated by said pits and coming from said recording medium;
   differentiation means for generating a differential signal of said light intensity signal;
   first means, connected to said differentiation means, for producing from said differential signal a signal indicative of zero points of said differential signal;
   second means, connected to said differentiation means, for producing from said differential signal a signal indicative of the presence of said pits; and
   third means responsive to the output signals of said first and second means to detect positions of said pits.

2. An optical detection apparatus according to claim 1, wherein the pit has a length in the predetermined direction which falls within a range of 0.45 to 0.75 times a length of the reproduction spot in the same direction.

3. An optical detection apparatus according to claim 2, wherein said second means comprises first and second comparator means for comparing said differential signal with first and second predetermined levels, respectively, and means, connected to said first and second comparator means, for producing a binary signal from the rise of an output signal of one of said first and second comparator means and the fall of an output signal of the other.

4. An optical detection apparatus according to claim 2, wherein said second means comprises differentiation means for differentiating said differential signal, and comparator means for comparing an output signal of said differentiation means with a predetermined level.

5. An optical detection apparatus according to claim 2, wherein said first means comprises comparator means for comparing said differential signal with zero level, delay means for delaying an output signal of said comparator means by a predetermined amount of delay, and means, connected to said delay means, for producing pulses respectively representing a rise instant or a rise instant of the output signal of said comparator means and having a width corresponding to the delay amount of said delay means.

6. An apparatus for optical detection of information comprising:
   a recording medium in which an array of pits are formed in a predetermined direction to record information;
   light irradiation means for irradiating a reproduction light spot onto said recording medium;
   means for generating a signal indicative of intensity of light modulated from said pits and coming from said recording medium;
   first differentiation means for producing a first differential signal of said light intensity signal;
   second differentiation means, connected to said first differentiation means, for producing a second differential signal of said first differential signal;
   first means, connected to said second differentiation means, for producing a signal indicative of zero points of said second differential signal;
   second means, connected to said first differentiation means, for producing from said first differential signal first and second binary signals by comparing said first differential signal with first and second predetermined levels, respectively; and
   third means responsive to the output signals of said first and second means to detect edge positions of said pits.

7. An optical detection apparatus according to claim 6, wherein said second means comprises first and second comparator means for comparing said first differential signal with said first and second predetermined levels, respectively.

8. An optical detection apparatus according to claim 7, wherein said third means comprises first gate means responsive to the output signal of said first means and the output signal of said first compartor means to produce a signal indicative of a front edge position of said pit; and second gate means responsive to the output signal of said first means and the output signal of said second comparator means to produce a signal indicative of a rear edge position of said pit.

9. An optical detection apparatus according to claim 6, wherein said first means comprises comparator means for comparing said second differential signal with a zero level, delay means for delaying an output signal of said comparator means by a predetermined amount of delay, and means connected to said delay means, for producing pulses respectively representing a rise instant or a fall instant of the output signal of said comparator means and having a width corresponding to the delay amount of said delay means.

10. An optical detection apparatus according to claim 7, wherein said first means comprises third comparator means for comparing said second differential signal with a zero level, delay means for delaying an output signal of said third comparator means by a predetermined amount of delay, and means connected to said delay means, for producing pulses respectively representing a rise instant or a fall instant of the output signal of said third comparator means and having a width corresponding to the delay amount of said delay means.

11. An optical detection apparatus according to claim 8, wherein said first means comprises third comparator means for comparing said second differential signal with zero level, delay means for delaying an output signal of said third compartor means by a predetermined amount of delay, and means connected to said delay means, for producing a pulses respectively representing a rise instant of fall instant of the output signal of said third comparator means and having a width corresponding to the delay amount of said delay means.

12. An optical detection apparatus according to claim 1, wherein said second means comprises first and second comparator means for comparing said differential signal with first and second predetermined levels, respectively, and means, connected to said first and second comparator means, for producing a binary signal from the rise of an output signal of one of said first and second comparator means and the fall of an output signal of the other.

13. An optical detection apparatus according to claim 1, wherein said second means comprises another differentiation means for differentiating said differential signal, and comparator means for comparing an output signal of said another differentiation means with a predetermined level.

14. An optical detection apparatus according to claim 1, wherein said first means comprises comparator means for comparing said differential signal with a zero level, delay means for delaying an output signal of said comparator means by a predetermined amount of delay, and means, connected to said delay means, for producing pulses respectively representing a rise instant or a rise instant of the output signal of said comparator means and having a width corresponding to the delay amount of said delay means.

15. A method for optical detection of information comprising the steps of:
irradiating a reproduction light spot onto a recording medium in which an array of pits are formed in a predetermined direction to record information;
detecting a signal indicative of intensity of light modulated by at least one pit and coming from said recording medium;
obtaining a differential signal of said light intensity signal;
obtaining from said differential signal a first signal indicative of zero points of said differential signal;
obtaining from said differential signal a second signal indicative of the presence of the at least one pit; and
detecting the center position of the at least one pit on the basis of the first and second signals.

16. A method for optical detection of information comprising the steps of:
irradiating a reproduction light spot onto a recording medium in which an array of pits are formed in a predetermined direction to record information;
detecting a signal indicative of intensity of light modulated by the pits and coming from said recording medium;
obtaining a first differential signal of said light intensity signal;
obtaining a second differential signal of said first differential signal;
obtaining from said second differential signal a first signal indicative of zero points;
detecting second and third signals by comparing said first differential signal with first and second predetermined levels, respectively; and
detecting edge positions of said pits on the basis of the first, second and third signals.

17. An optical detection method according to claim 16, wherein said first differential signal is compared with said first predetermined level to produce said second signal of binary form and with said second predetermined level to produce said third signal of binary form, and a front edge position of the pit is detected using said first and second signals and a rear edge position of the pit is detected using said first and third signals.

18. An optical detection method according to claim 15, wherein the at least one pit has a length in the predetermined direction which falls within a range of 0.45 to 0.75 times a length of the reproduction light spot in the same direction.

19. An optical detection method according to claim 15, wherein said differential signal is compared with a first predetermined level to produce a third signal of binary form and with a second predetermined level to produce a fourth signal of binary form, and said second signal is obtained using the rise of one of the third and fourth signals and the fall of the other.

20. An optical detection method according to claim 15, wherein said differential signal is differentiated to produce a further signal, and the further signal is compared with a predetermined level to provide said second signal.

* * * * *